United States Patent Office 3,384,579
Patented May 21, 1968

3,384,579
OLEOPHILIC TUNGSTEN DISULPHIDE
Aleksander Jerzy Groszek, Ealing, London, England, assignor to The British Petroleum Company Limited, London, England, a corporation of England
No Drawing. Filed Mar. 29, 1967, Ser. No. 626,680
Claims priority, application Great Britain, Apr. 4, 1966, 14,803/66
6 Claims. (Cl. 252—25)

ABSTRACT OF THE DISCLOSURE

Tungsten disulphide with improved load-carrying capacity is prepared by grinding tungsten disulphide in a high-energy mill in a low surface tension, low viscosity, low boiling point organic liquid.

---

This invention relates to lubricating compositions. In particular it relates to novel solid lubricants and to lubricating compositions containing them.

It is known that tungsten disulphide has valuable load-carrying properties in the extreme pressure region and that it retains these properties at high temperatures. Dispersions of tungsten disulphide can be used, for example, for the lubrication of chains in chain conveyors in ovens and other high-temperature vessels.

It has now been found that "oleophilic" tungsten disulphide has improved load-carrying properties.

This invention, therefore, provides oleophilic tungsten disulphide which has been prepared by grinding tungsten disulphide in the presence of a low surface tension, low viscosity, low boiling point organic liquid.

This invention further provides lubricating compositions based on a mineral or synthetic base oil and containing oleophilic tungsten disulphide as described above.

This invention yet further provides composites which comprise a metal or a solid polymeric matrix containing oleophilic tungsten disulphide and bearings fashioned from such composites.

The oleophilic tungsten disulphide, the base oils for the lubricating compositions, and the lubricating compositions and composites according to the invention are described in detail below.

OLEOPHILIC TUNGSTEN DISULPHIDE

Oleophilic tungsten disulphide will adsorb a greater proportion of n-dotriacontane than will non-oleophilic tungsten disulphide, for example, air-ground tungsten disulphide.

Oleophilic tungsten disulphide can be obtained by grinding tungsten disulphide in most organic liquids but it is desirable to use one the bulk of which can be easily removed from the oleophilic tungsten disulphide. Those liquids distilling below 500° C. and having a viscosity below 600 centistokes at 100° F. (38° C.) are therefore preferred. (Liquids having a surface tension below 72 dynes/cm., preferably from 10 to 40 dynes/cm., at 25° C. are preferred.)

Suitable organic liquids are lower molecular weight hydrocarbons including straight-chain or branched-chain, saturated or unsaturated alkyl compounds, saturated or unsaturated substituted or unsubstituted, cyclo-alkyl compounds, and substituted or unsubstituted aromatic compounds. Examples of such compounds are n-heptane, octene-2, 2,2,4-trimethylpentane, cyclohexane, benzene or toluene. Branched alkylene compounds are particularly preferred. Other suitable organic liquids are those compounds which contain fluorine, chlorine, or phosphorus and chlorine, for example, carbon tetrachloride.

Other suitable organic liquids are the polar oxygen compounds such as isopropyl alcohol. Silicone fluids can also be used.

For best results, the amount of tungsten disulphide in the tungsten disulphide organic liquid mixture should not exceed 50% wt.; preferably it should be from 2 to 20% wt.

The grinding may be carried out in any suitable grinding mill or device and it is desirable to continue the grinding until an oleophilic tungsten disulphide having a surface area (as determined by nitrogen adsorption) of from 10 to 400, preferably from 20 to 100, square metres per gram is obtained. Usually this can be achieved by grinding at normal temperatures for the required period but the temperature of the mixture may be artificially inceased if desired, for example, up to 400° C. In this case, liquids which have viscosities up to 600 centistokes at 100° F. (38° C.) may be used, for example, mineral lubricating oils, ranging from "spindle" oils to "bright stocks."

One of the quickest and most effective techniques is to carry out the grinding in a vibratory ball mill.

It is desirable to exclude air so far as possible during the grinding operation and this can be most easily achieved by filling the mill with the organic liquid first, followed by the balls and tungsten disulphide. A suitable procedure is to fill the mill with the liquid, add half the balls, then the tungsten disulphide and finally the rest of the balls. Such a grinding procedure might be referred to as a "closed" system.

When using a ball mill, it is of course desirable to use balls made of a material which does not react with the tungsten disulphide and which does not wear unduly during the grinding. Vibratory ball mills usually contain steel balls and these are suitable for the present purpose. It is particularly preferred to use a hard grade of steel for the balls and for the grinding chamber.

A magnetic filter can be used, if necessary, to remove small steel particles that may occur in the slurry that is produced in the grinding operation. A circulatory system can also be used wherein the slurry is pumped through an external magnetic filter and then returned to the mill. The circulatory system can be run semi-continuously, the slurry being pumped out after the grinding period and fresh material added to the system.

A suitable vibratory ball mill is sold under the trade name "Megapact," manufactured by Pilamec Limited.

The tungsten disulphide may be ground for from ¼ to 48 hours, though, from 2 to 16 hours is usually sufficient.

As an initial step the slurry of oleophilic tungsten disulphide produced in the grinding operation can be separated from the grinding balls by sieving or by displacement of the grinding liquid by another liquid and sieving.

If a relatively high boiling organic liquid is used for grinding it may be desirable to displace this liquid by a low boiling liquid. This liquid can then be removed by boiling. It is preferred to use vigorous boiling.

It is also possible to filter the slurry to obtain a filter cake of oleophilic tungsten disulphide.

In either case it is preferred to remove the last traces of grinding liquid or displacing liquid by heating the oleophilic tungsten disulphide in a vacuum oven for several hours, for example, at 100° C. and at 1 mm. mercury.

Alternatively and, in some circumstances preferably, the grinding liquid or displacing liquid is not removed from the oleophilic tungsten disulphide which remains in the slurry. This course is most preferred if the grinding liquid can also act as a base oil for a lubricating composition.

THE BASE OIL

The lubricating base oil may be a mineral oil or a synthetic oil.

Suitabel mineral oils are refined mineral oils obtained from petroleum, for example, those having a viscosity at 210° F. within the range from 2 to 50 centistokes, preferably from 4 to 40 centistokes.

Synthetic lubricating oils include organic esters, polyglycol ethers, polyphenyl ethers, fluorinated hydrocarbons, silicate esters, silicone oils and mixtures thereof.

The most important class of synthetic oils are the organic liquid polyesters, particularly the neutral polyesters, having a viscosity at 210° F. within the range from 1 to 30 centistokes. The expression "polyester" is used to mean esters having at least two ester linkages per molecule. The expression "neutral" is used to mean a fully esterified product. Examples of suitable polyesters include liquid diesters of aliphatic dicarboxylic acids and monohydric alcohols (for example, dioctyl sebacate, dinonyl sebacate, octyl nonyl sebacate, and the corresponding azelates and adipates), liquid diesters of aliphatic dicarboxylic acids and phenols (for example, those described in copending British Patent Application 31,249/65 and British Patent Specifications 1,044,550, 1,044,883, 1,058,906 and 1,059,955), and more complex polyesters (for examples, those described in British Patent Specifications 666,697, 743,571, 780,034, 861,962, 933,721, 971,901 and 986,068 and in U.S. Patent 3,321,401 granted May 23, 1967 and British Patent application 31,249/65).

DISPERSION LUBRICATING COMPOSITIONS

Oleophilic tungsten disulphide can be incorporated into base oils in quantities up to 50% wt., preferably up to 10% wt., based on the total weight, to form dispersions with surprisingly good lubricating properties.

The dispersions can be formed quite simply by stirring the oleophilic tungsten disulphide into the base oil. Alternatively, a mechanical aid to dispersion such as a colloid mill can be used.

The following are examples of methods by which the dispersions may be prepared:

(a) The grinding liquid is filtered off from the slurry of oleophilic tungsten disulphide produced in the grinding operation. The resulting filter cake is ground by, for example, feeding the cake through a colloid mill, and the resulting powder is stirred into the oil. The dispersion produced is finished by colloid milling.

(b) The grinding liquid is boiled off rapidly from the slurry of oleophilic tungsten disulphide to avoid the formation of a tungsten disulphide cake, the resulting powder is stirred into the oil and the dispersion is finished by colloid milling.

(c) Base oil is added to the slurry of oleophilic tungsten disulphide and the grinding liquid distilled off.

(d) Base oil is added to the slurry of oleophilic tungsten disulphide and the mixture circulated through a homogeniser (for example, of the Manton-Gaulin type) so that temperatures up to or exceeding 140° C. are produced. The temperature must be high enough to drive off the grinding liquid.

(e) The dispersion may also be made directly by grinding the tungsten disulphide in the base oil for the dispersion. For example, a low surface tension, low boiling point mineral lubricating oil with a viscosity up to 600 centistokes at 100° F. (38° C.) can be used. Elevated temperatures up to 400° C. can be used during the grinding.

Methods (c), (d) and (e) are particularly preferred. In general, the oleophilic tungsten disulphide can be incorporated into the base oil either at ambient temperatures or, if desired, at elevated temperatures, for example, up to 400° C.

COMPOSITES

The amount of oleophilic tungsten disulphide incorporated into the metal or solid polymeric matrix may be as low as 0.1 and as high as 50% wt. but is preferably from 1 to 25% wt. based on the weight of matrix plus oleophilic tungsten disulphide.

The oleophilic tungsten disulphide can be incorporated into the metal or solid polymeric matrix by any suitable method. However, it is preferably incorporated into the matrix by the mechanical mixing of either a wet or a dry powder of the metals or solid polymeric materials with either wet or dry powders of the oleophilic tungsten disulphide. It is preferred to mix the powders wetted with a volatile solvent such as petroleum ether. The mixture may then be compressed, for example, in a die, after removal of any solvent, and sintered at a suitable temperature, for example, above 300° C. for a composite comprising a polytetrafluoroethylene matrix.

Bearings can be fabricated from such composites by any suitable method, for example, by machining or by making use of the compression die mentioned above.

The following example serves to illustrate the invention.

Example

Dispersions of non-oleophilic and oleophilic tungsten disulphide were made up and their load-carrying properties compared using a Shell Four-ball machine. The testing method used was as described in Method 6503 which forms part of U.S. Federal Test Method Standard No. 791a, except that a period of 1 minute was used in one set of tests instead of 10 seconds.

The results are shown in Tables 1 and 2 below:

TABLE 1

| Type of tungsten disulphide dispersed in base oil | BET surface area of dispersed solid, m.²/g. | Heat of adsorption from n-heptane, m. cal./g. | | Tests in Four-ball machine of 2% dispersion in medicinal paraffin oil | |
|---|---|---|---|---|---|
| | | Adsorption of n-dotriacontane from its 0.2% solution at 20° C. | Adsorption of n-butyl alcohol from its 0.2% solution at 20° C. | Mean Hertz load, kg. | Welding load, kg. |
| Unground, 99.5% pure WS₂ powder, supplied by Koch-Light Limited. | 3 | 28 | 97 | 24 | 180 |
| WS₂, as above, ground in "Megapact" mill for 4 hours in n-heptane. | 25 | 100 | 455 | 36 | 250 |

It can be seen that grinding in n-heptane significantly improves the load-carrying properties of tungsten disulphide.

The heat of adsorption data show that the ground material has a much higher adsorptive capacity for both n-dotriacontane and n-butyl alcohol, which indicates that the numbers of both oleophilic and polar sites on the surface of the tungsten disulphide are increased considerably and in the same proportion (as compared with the unground material) during grinding.

TABLE 2

| Type of tungsten disulphide dispersed in base oil | Base oil | BET surface area of dispersed solid, m.²/g. | Load-carrying properties of dispersion | | | | | |
|---|---|---|---|---|---|---|---|---|
| | | | Wear scar, 60 min., 15 kg. | Wear scar, 1 min. | | | Mean Hertz load, kg. | Welding load, kg. |
| | | | | 100 kg. | 150 kg. | 200 kg. | | |
| Underground commercial WS₂ powder | BG 160/95 [1] | 5 | 0.38 | 1.64 | 2.50 | Weld | <30 | <200 |
| Commercial WS₂ as above, ground in "Megapact" mill, 8 hours, n-heptane. | BG 160/95 | 35 | 0.32 | 0.84 | 1.17 | 1.49 | 58 | 360 |

[1] This was a basic grade mineral lubricating oil with a Redwood I viscosity of 160 seconds at 140° F. (60° C.) and a viscosity index of 95.
[2] The grinding was carried out in a more powerful version of a "Megapact" mill than that used to produce the oleophilic tungsten disulphide of Table 1. The main difference was the increase in amplitude of vibration of the mill.

It can be seen from this table that oleophilic tungsten disulphide imparts much improved load-carrying capacity to lubricating dispersions as compared with lubricating dispersions containing non-oleophilic tungsten disulphide. The improved load-carrying capacity appears in both the antiwear and extreme pressure regions.

I claim:

1. An oleophilic tungsten disulphide with a surface area of from 10 to 400 square metres per gram, prepared by grinding tungsten disulphide in an organic liquid distilling below 500° C., having a viscosity below 600 centistokes at 38° C. and a surface tension less than 72 dynes/cm. at 25° C.

2. A product as claimed in claim 1, wherein the grinding is carried out in a vibratory ball mill.

3. A product as claimed in claim 1, wherein the organic liquid has a surface tension of from 10 to 40 dynes/cm. at 25° C.

4. A product as claimed in claim 1, wherein the organic liquid is a lower molecular weight hydrocarbon.

5. A product as claimed in claim 4, wherein the liquid is a branched alkyl compound.

6. A product as claimed in claim 5, wherein the liquid is 2,2,4-trimethylpentane.

References Cited

UNITED STATES PATENTS 3,059,769  10/1962  Frost _____ 252—25
3,338,822  8/1967   Groszek _____ 252—25

DANIEL E. WYMAN, *Primary Examiner.*

I. VAUGHN, *Assistant Examiner.*

UNITED STATES PATENT OFFICE
CERTIFICATE OF CORRECTION

Patent No. 3,384,579                               May 21, 1968

Aleksander Jerzy Groszek

It is certified that error appears in the above identified patent and that said Letters Patent are hereby corrected as shown below:

Column 1, line 63, "unsaturated" should read -- unsaturated, --. Column 2, line 3, "alkylene" should read -- alkyl --; line 22, "inceased" should read -- increased --. Column 3, line 18, "Suitabel" should read -- Suitable --.

Signed and sealed this 30th day of September 1969.

SEAL)
Attest:

Edward M. Fletcher, Jr.                     WILLIAM E. SCHUYLER, JR.
Attesting Officer                              Commissioner of Patents